Jan. 13, 1959  H. R. NILSSON  2,868,442
ROTARY DEVICE
Filed Oct. 26, 1954  2 Sheets-Sheet 1
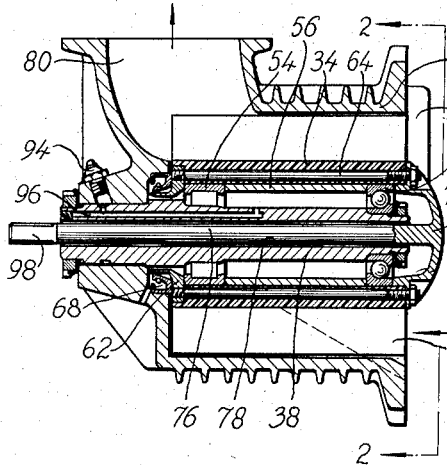
Fig. 1
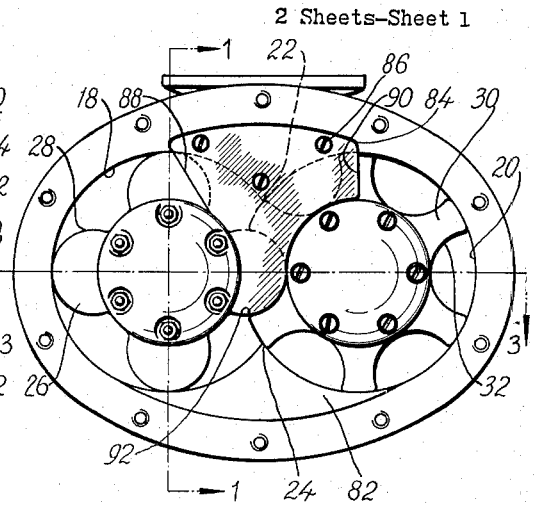
Fig. 2
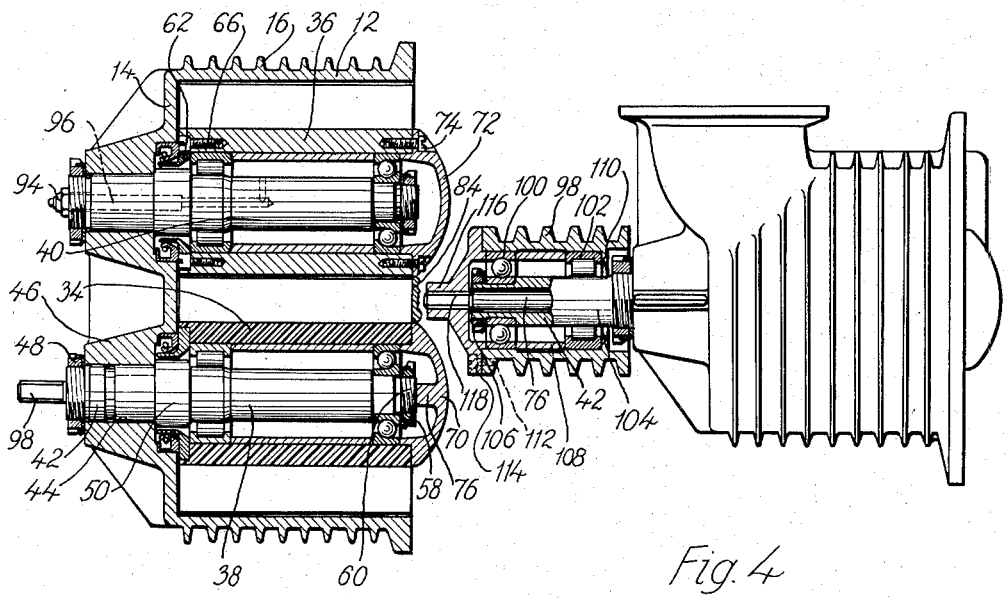
Fig. 3
Fig. 4
INVENTOR.
Hans Robert Nilsson
BY
his Attorney

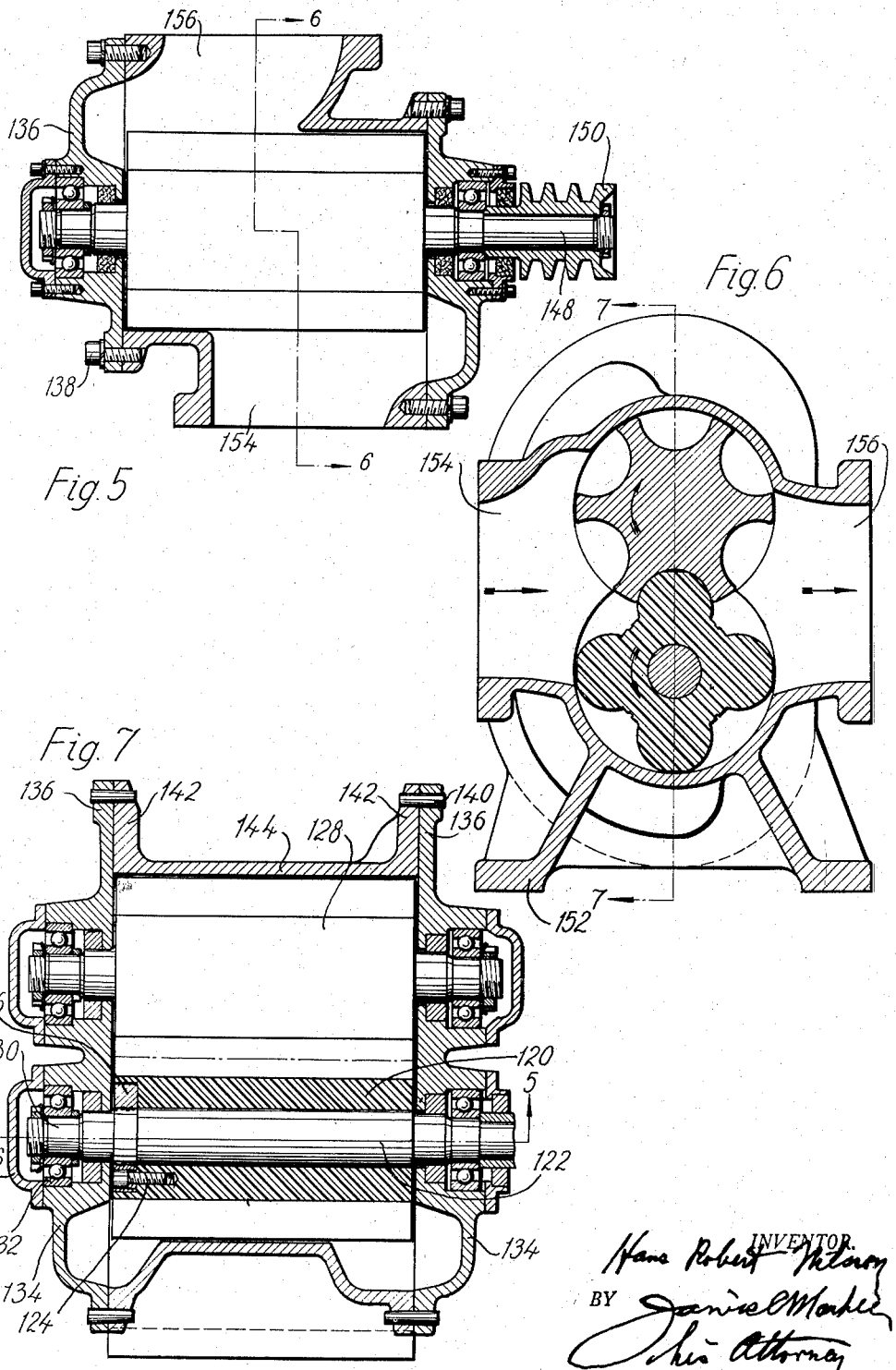

United States Patent Office 2,868,442
Patented Jan. 13, 1959

2,868,442

ROTARY DEVICE

Hans Robert Nilsson, Ektorp, Sweden, assignor, by mesne assignments, to Svenska Rotor Maskiner Aktiebolag, Nacka, Sweden, a corporation of Sweden Application October 26, 1954, Serial No. 464,690

Claims priority, application Sweden October 27, 1953

9 Claims. (Cl. 230—143)

The present invention relates to a rotary device comprising a casing having inlet and outlet ports and intersecting barrel portions for the reception of male and female rotors, hereinafter defined, having intermeshing helical lands and grooves providing chambers for the compression or expansion of an elastic fluid medium. The device is particularly suitable for compression as a low pressure compressor.

The general type of apparatus to which the invention is directed is ordinarily manufactured with rotors consisting of the same kind of, or similar, materials, such material also usually being employed in making the casing which encloses the rotors. If, as is customary, the barrel portion of the casing and the end plates thereof are made as separate members or parts considerable difficulty is encountered in assembling such parts with the precision required to provide the desired accuracy, and in spite of close tolerances in manufacture such exact centering of the rotors in the barrels of the casing required to secure exact parallelism of the rotor shafts is difficult to secure. These difficulties result in relatively high manufacturing costs.

Even with the most accurate manufacture and assembly, errors in the centering of the rotors in their respective barrels or bores and variations from parallelism between casing and the axes of the rotors may occur. This may well result in interference and possible seizing between the rotors.

As noted above, this invention is directed primarily to devices of the kind in which so-called male and female rotors having helical lands and grooves are employed, and as herein referred to male rotors are of the kind in which the lands and grooves lie outside, or substantially wholly outside, the pitch circle of the male rotor, while the lands and grooves of the female rotor lie within, or substantially within, the pitch circle of the female rotor. A preferred form of device embodying male and female rotors of the kind under consideration, for use with the present invention, is constructed in accordance with the principles set forth in U. S. Patent No. 2,622,787, granted December 23, 1952, to Hans R. Nilsson. In accordance with this disclosure, intermeshing male and female rotors are employed having profiles of the kind in which the lands upon rotation of the rotors are such that the crests of each convex land of the male rotor comes into sealing proximity with the walls of the cooperating groove of the female rotor at a place inside the pitch circle of the female rotor. Various modifications of the basic forms of profiles of the rotors are disclosed in the aforesaid patent to which reference may be had for further details, all of the forms of the rotors disclosed therein being especially suitable for the application of the present invention.

In accordance with the principles of the present invention, and through the utilization of rotors embodying the principles disclosed in the aforesaid Patent No. 2,622,787, a rotary device embodying the principles of the present invention may be simplified and made cheaper in manufacture, as compared with devices of like character heretofore produced.

In accordance with such principles the female rotor may be driven by the male rotor solely by the engagement of the lands of the male rotor with the grooves of the female rotor. By such operation the synchronizing gears heretofore considered indispensible in order to cause operation of the male and female rotors without interference and consequent seizing may be eliminated.

Other simplifications of construction and advantages as compared with prior constructions, will be pointed out in connection with the following description of examples of structures embodying the principles of the present invention as shown in the accompanying drawings in which rotary devices suitable as low pressure compressors are illustrated.

In the drawings:

Fig. 1 is a vertical longitudinal section taken on the line 1—1 of Fig. 2, of a rotary device embodying the invention;

Fig. 2 is an end view of the same device as viewed from the line 2—2 of Fig. 1;

Fig. 3 is a horizontal section taken on the line 3—3 of Fig. 2;

Fig. 4 is a side elevation, partly in section, of the device shown in Figs. 1 to 3;

Fig. 5 is a horizontal longitudinal section taken on the line 5—5 of Fig. 7 of a different example of rotary device embodying the invention;

Fig. 6 is a transverse section taken on the line 6—6 of Fig. 5; and

Fig. 7 is a vertical longitudinal section taken on the line 7—7 of Fig. 6.

The form of device illustrated in Figs. 1 to 4, inclusive, has a casing 10 comprising a barrel portion 12 and an end plate 14 integral therewith. The outer surfaces of the jacket portion are provided with cooling flanges 16. In the jacket portion two bores 18 and 20 are provided which intersect each other along the lines 22 and 24 and form bores for a male rotor 28 provided with four helical, substantially convex lands 26, and for a female rotor 32 provided with six helical, substantially concave lands 30. The manner of operation of rotary devices of the kind embodying helically grooved male and female rotors of the kind disclosed is well known in the art, and for the purpose of disclosing the present invention need not be described herein in detail.

The male and female rotors 28 and 32, respectively, consist of sleeves 34 and 36 each of which is journalled on spindles 38 and 40, respectively. Each of said spindles at their outer ends 42 are supported by the end plate 14 in bores 44 made in the latter element. The end plate provides reinforced portions 46 for carrying the ends 42 of the spindles. The ends of the spindles are threaded and locked by means of lock nuts 48 threaded against the reinforcement portions 46 of the end plate, the spindles 38 and 40 of the rotors inside of the bores 44 of the end plate providing abutments 50.

The rotor sleeves 34 and 36 are mounted on the outer races of bearings carried by spindles 38 and 40 and may, for example, consist of ball bearings or, as in the present example, of a ball bearing 52 and a roller bearing 54, the former being located at the low pressure end and the latter at the high pressure end of the device. The bearings 52 and 54 in the illustrated example are separated by a distance sleeve 56. To lock the rotor sleeves 34 and 36 to the respective spindles 38 and 40 against axial displacement, lock nuts 58 are threaded on the outer ends 60 of the spindles and bear against the ball bearings 52, while locking rings 62 of steel or similar material are recessed into the ends of rotor sleeves 34 and 36 facing the end plate 14. The locking ring 62 of the male rotor sleeve 34 is secured by means of a number of pins or cap bolts 64 passing through the sleeve and the locking ring on the female rotor is secured by means of screws 66. The locking rings 62 also form parts of a sealing construction and between them and the end plate 14 there are mounted sealing rings 68.

The ends of the rotor sleeves 34 and 36 remote from the end plate 14 are covered respectively by caps 70 and 72. Cap 70 of the male rotor is secured by means of cap bolts 64 and the cap of the female rotor is secured by means of cap bolts 74. The cap of the male rotor is integral with a shaft 76 which passes through a central bore 78 in the spindle 38 carrying the male rotor and said shaft serves as the driving shaft for the male rotor. The female rotor is driven by the male rotor solely by the engagement of the lands of the male rotor within the grooves of the female rotor.

The rotor sleeves are made of different materials and the sleeve 34 of the male rotor may advantageously consist of a plastic material or of compressed fiber material bonded with a suitable bonding medium as, for example, asbestos or glass or rock wool compressed with a suitable artificial resin such, for example, as phenolic aldehyde plastic or a silicone plastic, whereas the sleeve 36 of the female rotor advantageously consists of a metal or metal alloy, preferably steel or equivalent material.

In the illustrated construction of the device as a low pressure compressor the casing provides a radially-axially extending outlet 80. The inlet of the device is provided by the open end 82 of the jacket 12 and in order to prevent a direct communication between the inlet and outlet ports a cover plate 84 is secured by means of bolts 86 at the open end of the jacket. The inlet 82 is defined by the inner contour of the rotor bores 18 and 20 and the edge profiles 88, 90 and 92 of the cover plate 84, the form and extent of the inlet being such as to cut off direct communication between the inlet and the outlet ports while affording an axial inlet port opening on the inlet or low pressure side of the device.

By providing the casing with only one end plate for supporting the rotors at one of their ends, the casing and supporting end plate may be made in one piece or, if for certain reasons it is simpler to manufacture them as separate parts, these separate parts may be fastened together as a unit before the bores of the jacket and the bores in the end plate for the rotors are turned, the turning of which bores may be performed in one operation so that exact centering and parallelism of the shafts may be secured. Since the end of the rotors remote from the end plate terminate freely in corresponding jacket bores, no centering problems at this end of the rotors will occur. Difficulties otherwise incurred in attempting to coordinate the centering at one end plate with the centering at an end plate on the other end is thus eliminated.

Clearance or journal space between each rotor sleeve and its corresponding bearing spindle is supplied with lubrication from an outside source at the end plate end of the device by way of a supply nipple 94 discharging into a channel 96 in the spindle. Surplus lubricant is discharged by centrifugal force through clearance between the rotor sleeve and the spindle which carries it. In the present case the rotor sleeve at the end facing the end plate of the casing is fastened to the locking ring 62 which seals against the end plate of the casing through the medium of a sealing ring 68 recessed into the end plate of the casing. Between the locking ring 62 and an enlargement on the spindle, clearance is provided for escape of the lubricant which is centrifuged from the clearance space between the rotor sleeve and the bearing spindle which supports it. The surplus lubricant finally is discharged through an outlet channel in the end plate of the casing. The arrangement illustrated for lubrication of the rotor sleeves enables an ample lubrication to be effected without conduction of heat from the rotor sleeve to the spindle by means of lubricant filling the entire clearance space between the parts. The arrangement disclosed further insures ample lubrication of the bearings for the rotor sleeves.

On the driving shaft 76 of the male rotor there is advantageously provided a driving or transmission drum. In the example shown this drum consists of a multiple belt pulley 98 which is journalled on a ball bearing 100 and a roller bearing 102, mounted on the end 104 of the spindle 38 supporting the male rotor. A lock nut 106 retains the bearings 100 and 102 between which the distance ring 108 is provided. Pulley 98 has at its inner end an abutment 110 bearing against roller bearing 102 and is at its outer end secured to a flange 114 by a sleeve 116 mounted on the outer non-cylindrical end 118 of the driving shaft by means of bolts 112.

In the embodiments illustrated in Figs. 5 to 7, the male rotor consists of a sleeve 120, for example of plastic bonded fiber material, mounted on a shaft 122 which could for example be of steel and secured by means of bolts 124 to a flange 126 of the shaft. The female rotor 128 is made of solid steel and both of the ends 130 of the rotors are carried by ball bearings 132 mounted in hubs 134 in end plates 136 of the housing by means of bolts 138 and pins 140. The end plates 136 are secured to flanges 142 on the jacket 144 of the housing. The hubs 134 are covered by caps 146 and on one end 148 of the male rotor shaft extending through a corresponding end plate a multiple belt pulley 150 is secured. In this case also the female rotor is thus directly driven solely by the male rotor without the use of synchronizing gears. At its lower end the jacket 144 is provided with a foot 152 and, considered in a horizontal plane approximately midway of the height of the device, an inlet port 154 and an outlet port 156 extend axially-radially in communication with the working chambers of the device.

The construction of the apparatus hereinbefore described may be varied within the scope of the appended claims without departing from the principles of the invention.

What I claim is:

1. A rotary device comprising a casing structure providing parallel intersecting bores and having inlet and outlet ports communicating with said bores, a male rotor rotatably mounted for rotation in one of said bores and having helical lands of generally convex cross-section with intervening grooves the major portions of which lie outside the pitch circle of said male rotor, a female rotor mounted for rotation in a second bore and having helical lands of generally concave cross-section with intervening grooves the major portions of which lie inside the pitch circle of said female rotor, said lands and grooves intermeshing and cooperating with each other and the casing structure to provide working chambers for fluid in the device communicating with said ports as the rotors revolve, the profiles of the lands and grooves of said rotors being of such curvature that upon rotation of the rotors the crests of each convex land of said male rotor comes into sealing proximity with the walls of the cooperating groove of said female rotor at a place inside the pitch circle of said female rotor, one of said rotors being driven by the other of said rotors solely by engagement of the lands of said other of said rotors with the grooves of said one of said rotors, one of said rotors being made of a plastic material and the other of said rotors being made of a metal.

2. A rotary device as defined in claim 1, in which one of the rotors is made of plastic bonded fibre material.

3. A rotary device as defined in claim 2, in which one of the rotors is made of plastic bonded asbestos.

4. A rotary device as defined in claim 2, in which one of the rotors is made of plastic bonded glass wool.

5. A rotary device as defined in claim 2, in which one of the rotors is made of plastic bonded rock wool.

6. A rotary device as defined in claim 2, in which the binding medium consists of a phenolic formaldehyde plastic.

7. A rotary device as defined in claim 2, in which the binding medium consists of a silicon plastic.

8. A rotary device as defined in claim 1, in which the other rotor is made of steel.

9. A rotary device as defined in claim 1, in which the other rotor is made of a surface hardened alloy.

References Cited in the file of this patent

UNITED STATES PATENTS

| | | |
|---|---|---|
| 951,627 | Blazer | Mar. 8, 1910 |
| 960,993 | Motsinger | June 7, 1910 |
| 1,542,614 | Ellis | June 16, 1925 |
| 1,965,557 | Montelius | July 3, 1934 |
| 2,111,568 | Lysholm et al. | Mar. 22, 1938 |
| 2,220,588 | Thompson | Nov. 5, 1940 |
| 2,338,065 | Ungar | Dec. 28, 1943 |
| 2,361,146 | Montelius | Oct. 24, 1944 |
| 2,457,314 | Lysholm | Dec. 28, 1948 |
| 2,519,913 | Lysholm | Aug. 22, 1950 |
| 2,590,561 | Montelius | Mar. 25, 1952 |
| 2,620,968 | Nilsson | Dec. 9, 1952 |
| 2,622,787 | Nilsson | Dec. 23, 1952 |
| 2,755,990 | Nilsson et al. | July 24, 1956 |

FOREIGN PATENTS

| | | |
|---|---|---|
| 17,826 | Great Britain | of 1899 |
| 437,042 | Great Britain | June 4, 1935 |